United States Patent [19]

Nakaya

[11] Patent Number: 5,379,323
[45] Date of Patent: Jan. 3, 1995

[54] DQPSK DELAY DETECTION CIRCUIT
[75] Inventor: Kazuyoshi Nakaya, Kanagawa, Japan
[73] Assignee: Murata Mfg. Co., Ltd., Kyoto, Japan
[21] Appl. No.: 84,400
[22] Filed: Jun. 29, 1993
[30] Foreign Application Priority Data Jul. 2, 1992 [JP] Japan .................................. 4-175483

[51] Int. Cl.$^6$ ........................................... H04L 27/22
[52] U.S. Cl. ...................................... 375/85; 329/304
[58] Field of Search ...................... 375/56, 54, 83, 84, 375/85; 329/304

[56] References Cited

U.S. PATENT DOCUMENTS

| | | | |
|---|---|---|---|
| 4,438,524 | 3/1984 | Muilwijk | 375/85 |
| 4,847,869 | 7/1989 | Labedz et al. | 375/85 |
| 4,879,728 | 11/1989 | Tarallo | 375/84 |

FOREIGN PATENT DOCUMENTS

| | | | |
|---|---|---|---|
| 0073459 | 4/1986 | Japan | 375/85 |
| 2183974 | 6/1987 | United Kingdom | 375/85 |

Primary Examiner—Stephen Chin
Assistant Examiner—T. Ghebretinsae
Attorney, Agent, or Firm—Jordan and Hamburg

[57] ABSTRACT

A DQPSK delay detection circuit includes a semi-synchronous detector synchronously detecting an input signal to obtain two demodulated signals, a low-pass filter for extracting a baseband signal from the demodulated signals, an A-D convertor sampling the baseband signal by a clock signal with a frequency 32 times higher than a symbol rate frequency and converting them to digital values with a predetermined number of quantization bits, a clock pulse generator generating clock signals synchronized with the baseband signal and having a frequency equal to and two times as high as the symbol rate frequency with a phase adjusted in accordance with a change of an eye pattern of an output of the A-D convertor, a data delay unit delaying the output of the A-D convertor by a time equivalent to one time slot according to a clock signal synchronized with the baseband signal and having a frequency equal to the symbol rate frequency, an operation unit generating signals I and Q from the output of the A-D convertor and a one-time-slot-before output of the A-D convertor delayed by the data delay unit according to a clock signal synchronized with the baseband signal and having a frequency equal to the symbol rate frequency, and a judging unit demodulating an in-phase component signal and orthogonal component signal from the signals I and Q and performing parallel-serial conversion to output data.

6 Claims, 4 Drawing Sheets

DQPSK DELAY DETECTION CIRCUIT

BACKGROUND OF THE INVENTION

1. Field of the Invention

The present invention relates to a DQPSK (Differential Quaternary Phase Shift Keying) delay detection circuit and in particular to a DQPSK delay detection circuit for materializing a low power consumption and minimizing the circuit size.

2. Description of the Prior Art

FIG. 4 is a block diagram showing the structure of the DQPSK delay detection circuit reported in "Proceeding of The 1990 IEICE Fall Conference; B-300 Constitution and characteristics of p/4 shift QPSK baseband delay detector".

This DQPSK delay detection circuit 51 comprises a semi-synchronous detector 2, low-pass filter 3, A-D convertor 4, data delay unit 55, operation unit 56, judging unit 7, and clock pulse generator 58.

The data delay unit 55 has a shift register T'. The clock pulse generator 58 is provided with a clock signal generation circuit 9 and BTR (Bit Timing Recovery) 60.

The clock signal generation circuit 9 of the clock pulse generator 58 supplies a 32f clock signal, a signal with a frequency 32 times as high as the symbol rate frequency f, to the A-D convertor 4, data delay unit 55, and operation unit 56. The BTR 60 of the clock pulse generator 58 supplies a 2f clock signal, a signal with a frequency two times as high as the symbol rate frequency f, to the judging unit 7.

In the above mentioned DQPSK delay detection circuit 51, semi-synchronous detector 2 synchronously detects an input signal, the obtained in-phase detection output X and orthogonal detection output Y is passed through the low-pass filter 3, the A-D convertor 4 samples the outputs X and Y at a frequency 32 times as high as the symbol rate frequency f, and performs an analog to digital conversion with six quantization bits. The shift register T' of the data delay unit 55 delays the output of the A-D convertor 4 by a time equivalent to the one time slot.

In the next step, the present output of the A-D convertor 4 and the one-time-slot-before output, delayed by the data delay unit 55, of the same is computed to obtain orthogonal signals I and Q containing a code bit information. Further, BTR (Bit Timing Recovery) 60 of the clock pulse generator 58, regenerates a 2f clock signal on the basis of the timing of the code bit of the signal Q outputted from the operation unit 56, the judging unit 7 selects a point with the largest eye aperture among 32 sample points in one time slot on the basis of the regenerated 2f clock signal, in-phase signal and orthogonal signal modulations and parallel-serial conversions are performed before outputing the data.

In the above explained conventional DQPSK delay detection circuit 51, each of the units (A-D convertor 4, data delay unit 55, and operation unit 56) on the way to the operation unit 56 performs high-speed processing at the 32f frequency, which is 32 times as high as the symbol rate frequency f, till the BTR 60 of the clock pulse generator 58 regenerates a 2f clock signal on the basis of the timing of the code bit of the signal Q.

There occurs a drawback that the power consumption increases because the high-speed processing is performed at a frequency 32 times as high as the symbol rate frequency f.

Assuming the number of quantization bits in the A-D convertor 4 as m and the ratio of the sampling frequency to the symbol rate frequency (=sampling frequency/symbol rate frequency) in the shift register T' of the data delay unit 55 as n, 2 mn flip flops are required for the shift register T' of the data delay part 55 in general. Because the above embodiment according to the prior art requires "2×6×32" flip flops, a problem occurs that a large shift register T' becomes necessary and thereby a decrease of circuit size is difficult.

SUMMARY OF THE INVENTION

It is an object of the present invention to provide a DQPSK delay detection circuit for materializing a low power consumption and minimizing the circuit size.

The DQPSK delay detection circuit of the present invention is characterized by comprising a semi-synchronous detector for synchronously detecting an input signal to obtain two demodulated signals such as an in-phase detection signal and orthogonal detection signal, a low-pass filter for extracting a baseband signal from these two demodulated signals, an A-D convertor for sampling the baseband signal by a clock signal with a frequency sufficiently higher than the symbol rate frequency and converting them from analog to digital values with a predetermined number of quantization bits, a clock pulse generator for generating clock pulse signals synchronized with the baseband signal and having a frequency equal to and a frequency two times as high as the symbol rate frequency respectively according to the change of an eye pattern of the output of the A-D convertor, a data delay unit for delaying the output of the A-D convertor by the time equivalent to one time slot according to a clock pulse signal synchronized with the baseband signal and having a frequency equal to the symbol rate frequency, an operation unit for generating signals I and Q from the present output of the A-D convertor and the one-time-slot-before output of the A-D convertor delayed by the data delay circuit according to a clock signal synchronized with the baseband signal and having a frequency equal to the symbol rate frequency, and a judging unit for demodulating an in-phase component signal and orthogonal component signal from the signals I and Q according to a clock pulse signal synchronized with the baseband signal and having a frequency two times as high as the symbol rate frequency and performing parallel-serial conversion to output data.

The DQPSK delay detection circuit of the present invention obtains a baseband signal from an input signal by a semi-synchronous detector and low-pass filter and converts the baseband signal from analog to digital values by an A-D convertor. Then, the circuit computes the present output of the A-D convertor and the one-time-slot-before output of the A-D convertor delayed by a delay unit using an operation unit to obtain signals I and Q. Moreover, the circuit obtains data from the signals I and Q using the judging unit to output the data.

In this case, the clock pulse signal supplied to the delay unit and the operation unit is generated according to the change of the eye pattern of the output of the A-D convertor, which is synchronized with the baseband signal and has the symbol rate frequency.

As described above, because the clock pulse signal synchronized with the baseband signal and having the symbol rate frequency is generated to operate the delay unit and operation unit, the power consumption can be decreased compared with the existing conventional circuit which is operated at a high speed. Moreover, the size of the delay unit and circuit can be decreased.

SPECIFIC DESCRIPTION OF THE EMBODIMENT

Figure 1:
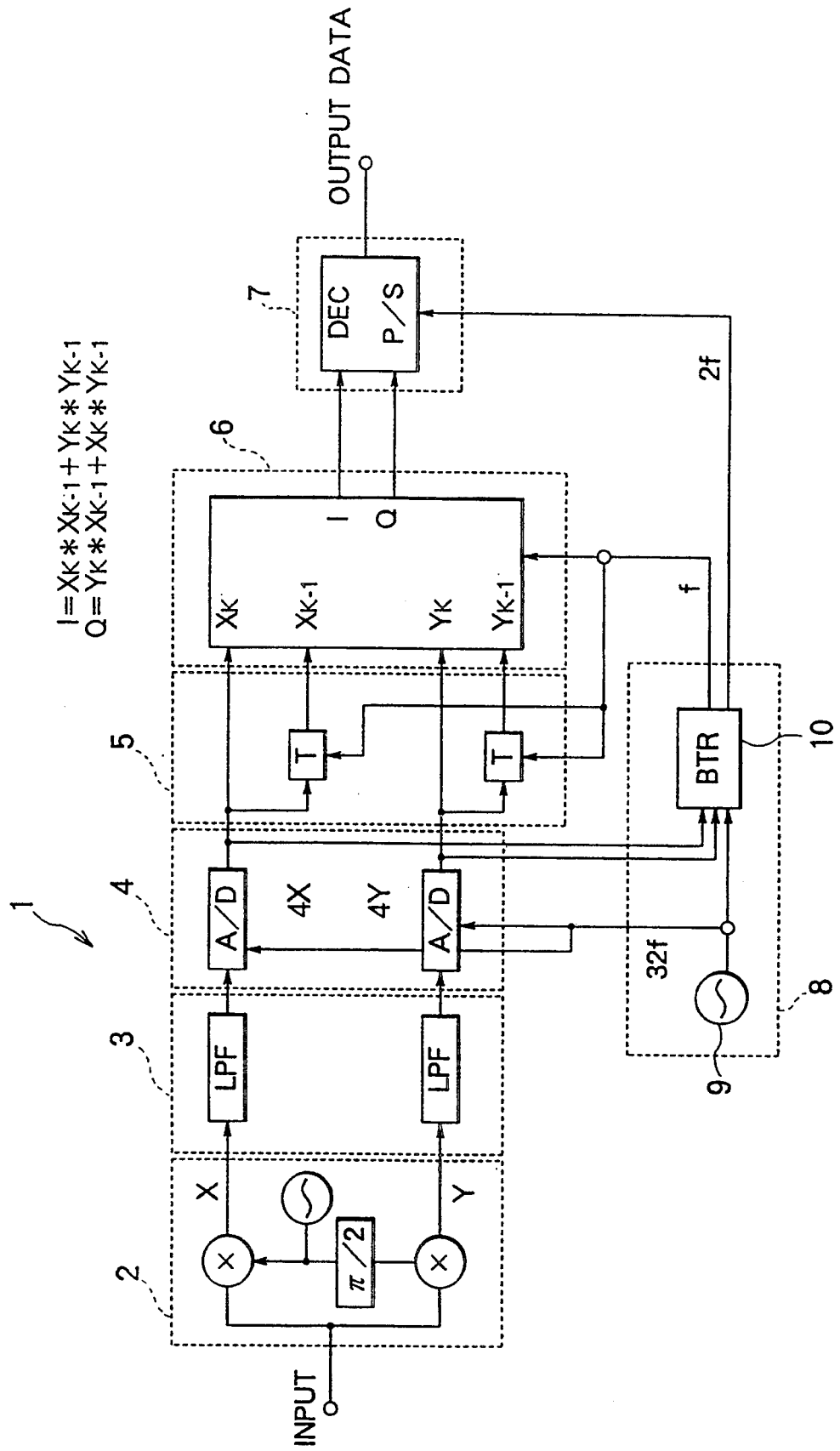
FIG. 1 is a block diagram of the DQPSK delay detection circuit which is an embodiment of the present invention.

The present invention is more precisely described below according to an embodiment shown in the drawings. However, the present invention is not restricted to the embodiment.

FIG. 1 is a block diagram of the constitution of the DQPSK delay detection circuit which is an embodiment of the present invention.

The DQPSK delay detection circuit 1 comprises a semi-synchronous detector 2, low-pass filter 3, A-D convertor 4, data delay unit 5, operation unit 6, judging unit 7, and clock pulse generator 8.

The data delay part 5 has a shift register T.

The clock pulse generator 8 is provided with a clock signal generation circuit 9 and BTR 10.

A 32f clock signal with a frequency 32 times as high as the symbol rate frequency f is supplied to the A-D convertor 4 from the clock signal generation circuit 9 of the clock pulse generator 8.

A clock signal f with a symbol rate frequency f is supplied to the data delay unit 5 and the operation unit 6 from the BTR 10 of a clock pulse generator 8.

Moreover, a 2f clock signal with a frequency two times as high as the symbol rate frequency f is supplied to the judging unit 7 from the BTR 10 of the clock pulse generator 8.

Figure 2:
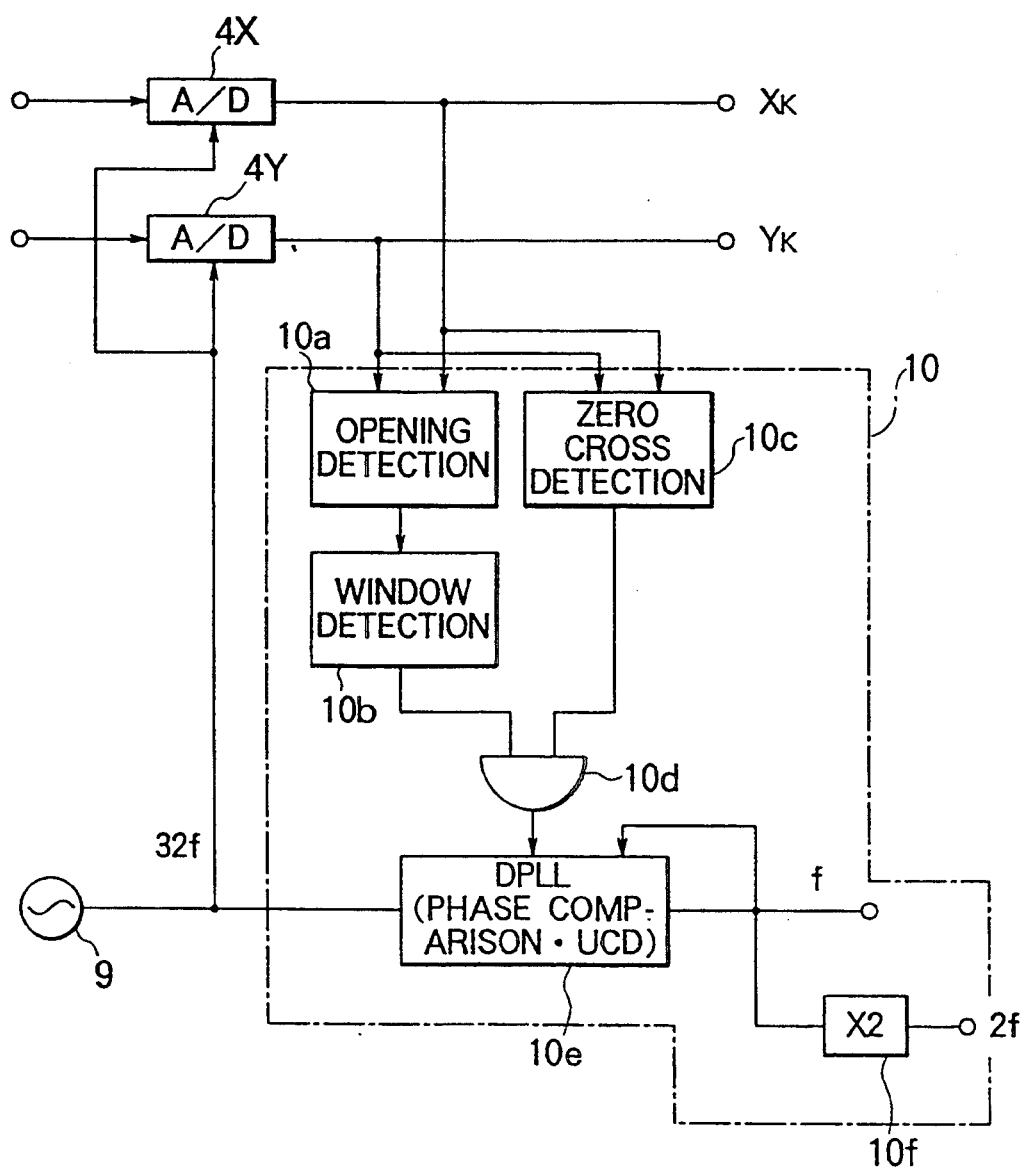
FIG. 2 is a block diagram of a clock pulse generator.

As shown in FIG. 2, the BTR 10 comprises an opening detection unit 10a, window setting unit 10b, zero cross detection unit 10c, AND gate unit 10d, DPLL unit 10e, and frequency doubling circuit 10f.

The operations of the DQPSK delay detection circuit are described in detail in the following.

The DQPSK delay detection circuit 1 synchronously detects an input signal using the semi-synchronous detector 2 and passes the obtained in-phase detection output X and orthogonal detection output Y through the low-pass filter 3 to obtain a baseband signal. This DQPSK delay detection circuit 1 then samples the baseband signal using the A-D convertor 4 at a frequency 32 times as high as the symbol rate frequency f to convert the signal from analog to digital values with six quantization bits.

A-D converted digital data values Xk and Yk are inputted to the data delay unit 5 and the BTR 10 of the clock pulse generator part 8.

The digital data values Xk and Yk inputted to the data delay unit 5 are directly outputted to the operation unit 6 and also inputted to shift registers T and T. The shift registers T and T output digital data values Xk-1 and Yk-1 which are delayed by the time equivalent to one time slot to the values inputted to the operation unit 6.

The digital data values Xk and Yk inputted to the BTR 10 of the clock pulse generator 8 are supplied to the opening detection unit 10a and zero cross detection unit 10c.

Figure 3:
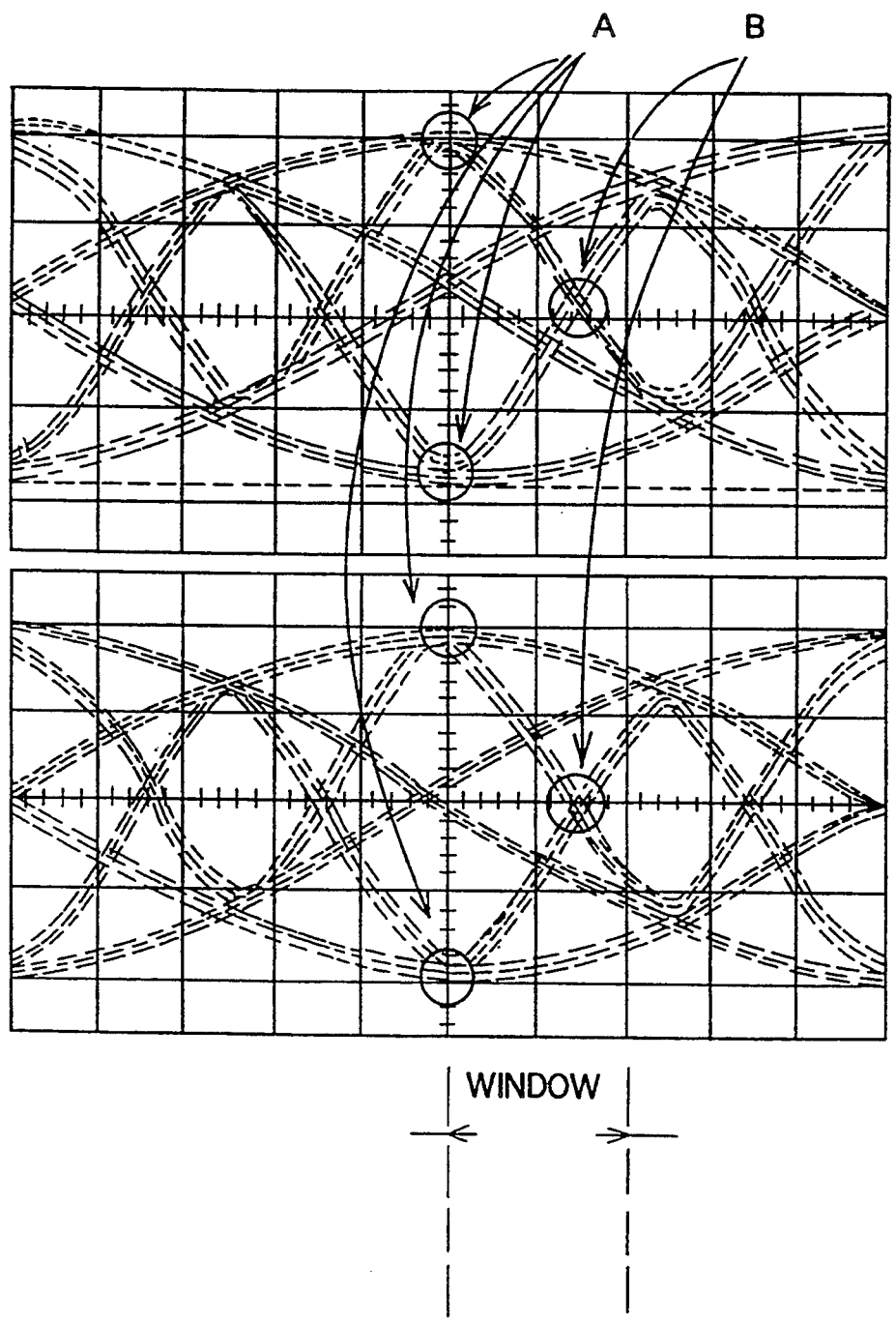
FIG. 3 is an illustration for explaining an eye pattern of the output of an A-D convertor.
Figure 4:
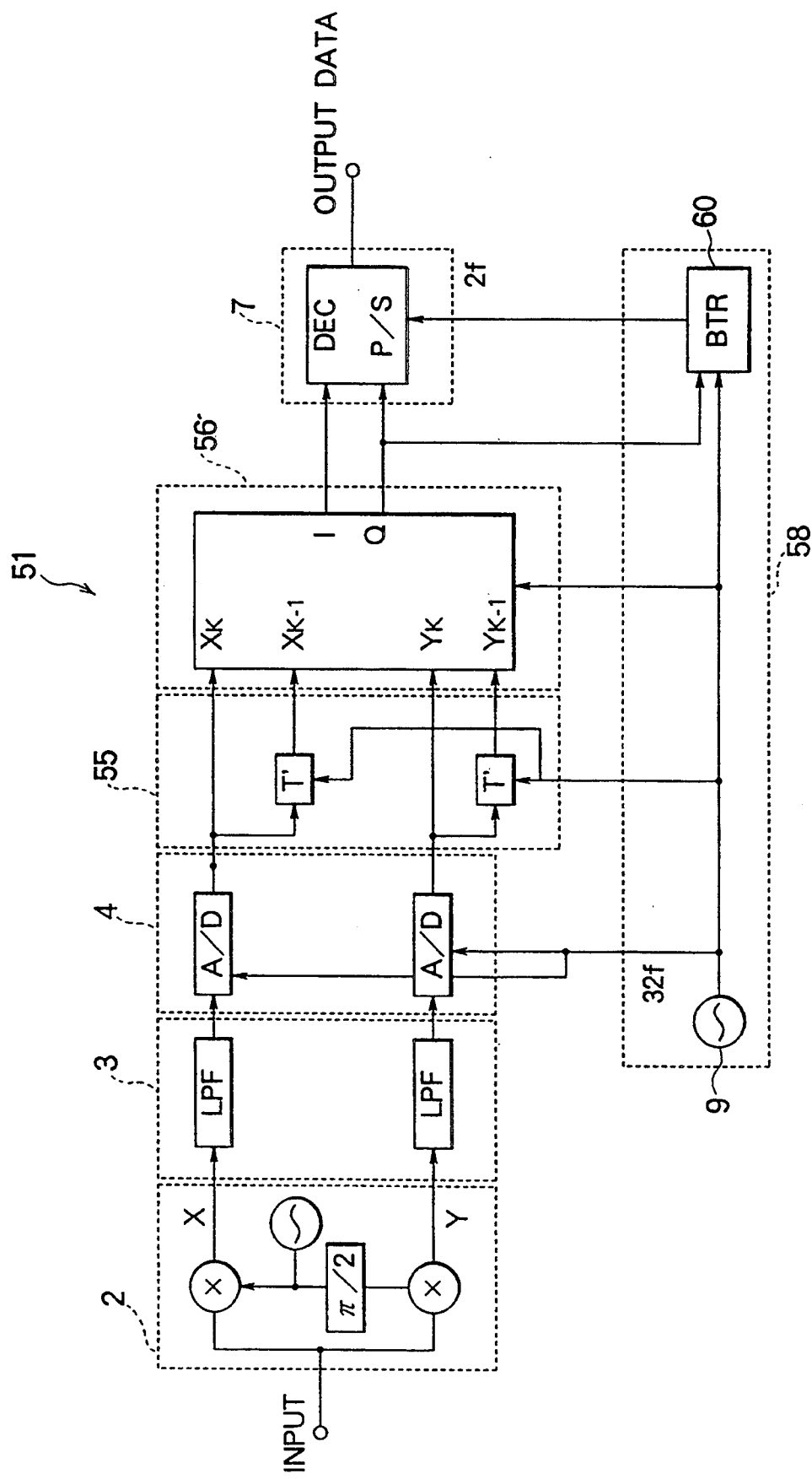
FIG. 4 is a block diagram of a conventional DQPSK delay detection circuit.

From the digital data values Xk and Yk the opening detection unit 10a detects the timing (point A in FIG. 3) when the opening of an eye pattern is maximum and outputs an opening timing signal to the window setting unit 10b.

The window setting unit 10b starts a timer using the opening timing signal as a trigger. The timer outputs a window signal with a predetermined time length (the width of the window shown in FIG. 3) to the AND gate unit 10d.

From the digital data values Xk and Yk the zero cross detection unit 10c detects a zero cross point (point B in FIG. 3) of the eye pattern and outputs a zero-cross-point timing signal to the AND gate unit 10d.

The AND gate unit 10d passes further the inputted zero-cross-point signal while the window signal is inputted.

The DPLL unit 10e generates a clock signal f from a 32f clock signal. When the zero-cross-point timing signal is inputted to the DPLL unit 10e, the DPLL unit 10e judges the delay and or the lead of the phase of the clock signal f to adjust the timing. As a result, the clock signal f synchronizes with the baseband signal and becomes a clock signal with the symbol rate frequency f.

Frequency doubling circuit 10f generates a clock signal 2f synchronizing with the baseband signal and having a frequency two times as high as the symbol rate frequency f from the clock signal f.

As described above, when assumed the number of quantization bits in the A-D conversion part 4 as m and the ratio of the sampling frequency to the symbol rate frequency (=sampling frequency/symbol rate frequency) in the shift register T of the data delay part 5 as n, 2 mn flip flops are required for the shift register T of the data delay unit 5. For this embodiment, however, the shift register T requires only "2×6×1" flip flops because the clock signal f synchronized with the baseband signal and having the symbol rate frequency f is supplied to the data delay unit 5. Moreover, the power consumption decreases.

The operation unit 6 performs a predetermined operation with the digital data values Xk and Yk and the one-time-slot-before digital data values Xk-1 and Yk-1 to demodulate orthogonal signals I and Q. In this case, the power consumption decreases because the clock signal f synchronized with the baseband signal and having the symbol rate frequency f is supplied to the operation unit 6.

The DQPSK delay detection circuit of the present invention makes it possible to control power consumption because the delay part and operation part are operated by a clock signal synchronized with the baseband signal and having the symbol rate frequency f. Moreover, the circuit can be simplified and decreased in size because the number of shift registers in the delay part can be decreased.

What is claimed is:

1. A DQPSK delay detection circuit comprising:

a semi-synchronous detector for synchronously detecting an input signal to obtain two demodulated signals, a low-pass filter for extracting a baseband signal from the two demodulated signals, an A-D convertor for sampling the baseband signal by a clock signal with a frequency sufficiently higher than a symbol rate frequency and converting them from analog to digital values with a predetermined number of quantization bits to produce an output, a clock pulse generator for generating clock signals synchronized with the baseband signal and having a frequency equal to and a frequency two times as high as the symbol rate frequency with a phase adjusted in accordance with a change of an eye pattern of the output of the A-D convertor, a data delay unit for delaying the output of the A-D convertor by a time equivalent to one time slot according to a clock signal synchronized with the baseband signal and having a frequency equal to the symbol rate frequency, an operation unit for generating signals I and Q from the output of the A-D convertor and a one-time-slot-before output of the A-D convertor delayed by the data delay unit according to a clock signal synchronized with the baseband signal and having a frequency equal to the symbol rate frequency, and a judging unit for demodulating an in-phase component signal and orthogonal component signal from the signals I and Q and performing parallel-serial conversion to output data.

2. A DQPSK delay detection circuit according to claim 1, wherein said two demodulated signals from said semi-synchronous detector include an in-phase detection signal and an orthogonal detection signal.

3. A DQPSK delay detection circuit according to claim 1, wherein said A-D convertor samples the baseband signal by a clock signal with a frequency 32 times higher than the symbol rate frequency.

4. A DQPSK delay detection circuit according to claim 1, wherein said A-D convertor converts the sampled baseband signals from analog to digital values with six quantization bits.

5. A DQPSK delay detection circuit according to claim 1, wherein the clock pulse generator includes a clock signal generation circuit which produces said clock signal with the frequency sufficiently higher than the symbol rate frequency, and a bit timing recovery circuit connected with the clock pulse generator and the A-D convertor and which produces the clock signals having the frequency equal to and the frequency two times as high as the symbol rate frequency with the phase adjusted in accordance with the change of the eye pattern of the output of the A-D convertor.

6. A DQPSK delay detection circuit according to claim 5, wherein said bit timing recovery circuit includes:

an opening detection unit connected with the A-D convertor and which detects a timing when an opening of the eye pattern is at a maximum and outputs an opening timing signal, a window setting unit connected with the opening detection unit for outputting a window signal with a predetermining time length by using the opening timing signal as a trigger, a zero cross detection unit connected with the A-D convertor and which detects a zero cross point of the eye pattern and outputs a zero-cross-point timing signal, an AND gate connected with the window setting unit and the zero cross detection unit, and which outputs the zero-cross-point timing signal when the window signal is input thereto, a DPLL unit connected with an output of the AND gate and which generates the clock signal synchronized with the baseband signal and having a frequency equal to the symbol rate frequency, and a frequency doubling circuit connected with an output of the DPLL unit and which generates the clock signal synchronized with the baseband signal and having a frequency two times as high as the symbol rate frequency.

* * * * *